(12) United States Patent
Ling et al.

(10) Patent No.: US 11,309,782 B2
(45) Date of Patent: Apr. 19, 2022

(54) LINEAR VIBRATION MOTOR

(71) Applicant: AAC Technologies Pte. Ltd., Singapore (SG)

(72) Inventors: Fanghua Ling, Shenzhen (CN); Feng Tao, Shenzhen (CN); Xiaofeng Pu, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 357 days.

(21) Appl. No.: 16/706,820

(22) Filed: Dec. 8, 2019

(65) Prior Publication Data

US 2020/0212783 A1 Jul. 2, 2020

(30) Foreign Application Priority Data

Dec. 30, 2018 (CN) .......................... 201822278301.7

(51) Int. Cl.
*H02K 33/02* (2006.01)
*H02K 33/18* (2006.01)
*B06B 1/04* (2006.01)

(52) U.S. Cl.
CPC .............. *H02K 33/18* (2013.01); *B06B 1/045* (2013.01)

(58) Field of Classification Search
CPC .......... H02K 1/34; H02K 33/02; H02K 33/06; H02K 33/16; H02K 33/18; B06B 1/045
See application file for complete search history.

(56) References Cited

FOREIGN PATENT DOCUMENTS

| CN | 102025256 A1 | 4/2011 |
| CN | 106817006 A1 | 6/2017 |
| CN | 209389907 B1 | 9/2019 |
| CN | 209389910 B1 | 9/2019 |

OTHER PUBLICATIONS

PCT search report dated Jan. 21, 2020 by SIPO in related PCT Patent Application No. PCT/CN2019/110645 (10 Pages).

*Primary Examiner* — Ramon M Barrera
(74) *Attorney, Agent, or Firm* — W&G Law Group

(57) ABSTRACT

The present invention provides a linear vibration motor, which includes a shell with a receiving space and a vibrator and a stator both housed in the shell body. One of the vibrator and the stator includes a solenoid, the other of the vibrator and the stator includes a magnetic circuit structure having a magnetic conductive frame and four magnets surrounding the magnetic conductive frame. By virtue of the configuration of the invention, the magnetic field strength can be significantly enhanced. The magnetic conductive frame can not only be used for magnetic guiding and fixing the magnets, but also can be used for fixing the weight to simplify the assembly structure and improve the reliability. Further, the response speed of the linear vibration motor is fast, the acceleration is great and the frequency band is wide.

10 Claims, 3 Drawing Sheets

LINEAR VIBRATION MOTOR

FIELD OF THE PRESENT DISCLOSURE

The present disclosure relates to the field of electrical transducers, more particularly to a linear vibration motor in a mobile device, for converting electrical signals into tactile feedbacks.

DESCRIPTION OF RELATED ART

With the development of electronic technology, portable consumer electronic products, such as mobile phones, handheld game consoles, navigation devices or handheld multimedia entertainment devices are more and more popular. These electronic products generally use linear vibration motors to perform system feedback, such as phone call prompt, information prompt, navigation prompt, vibration feedback of game machines, etc. Such a wide range of applications requires that the vibration motor has excellent performance and long service life.

In related technology, the vibration motor includes a shell, a vibrator arranged in the shell and a stator matched with the vibrator. The vibrator includes a weight and a magnet embedded in the weight. The stator includes a coil fixed on the shell. The vibration motor of this structure has slow response speed, small acceleration and narrow frequency band.

Therefore, it is necessary to provide a new linear vibration motor to solve the above technical problems.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
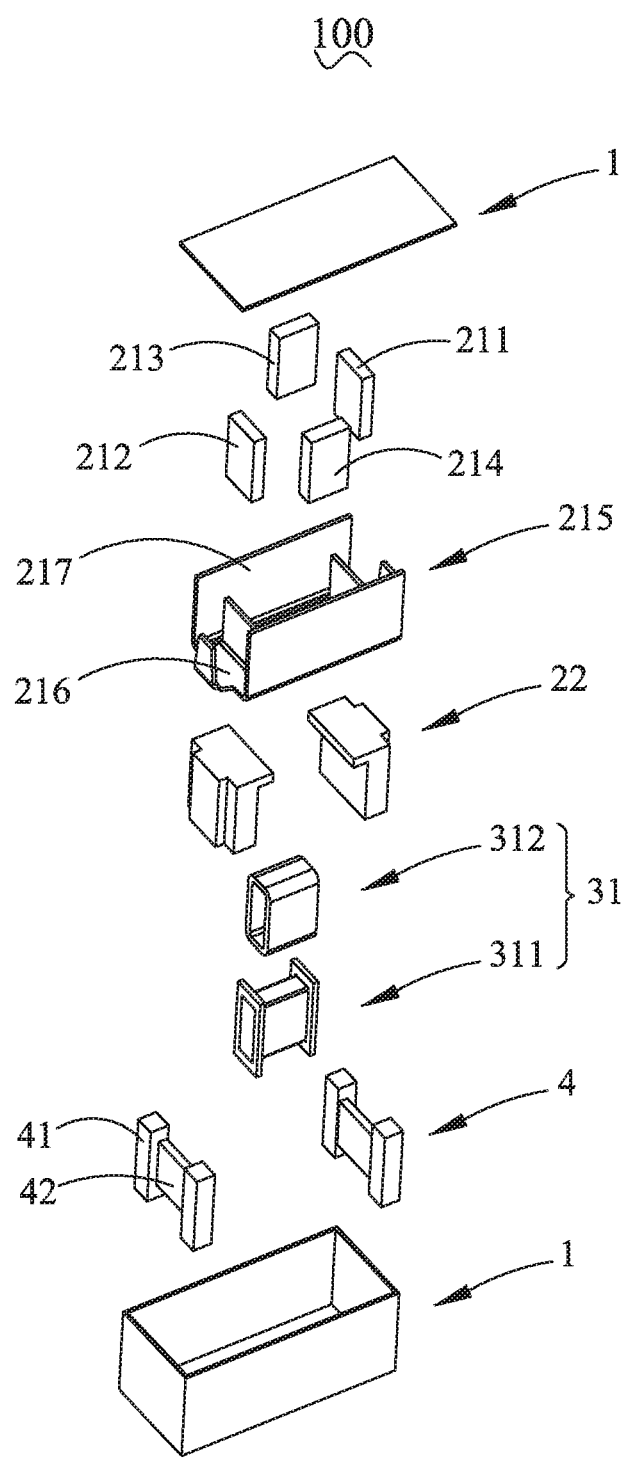
FIG. 1 is an isometric and exploded view of a linear vibration motor in accordance with an exemplary embodiment of the present disclosure.
Figure 2:
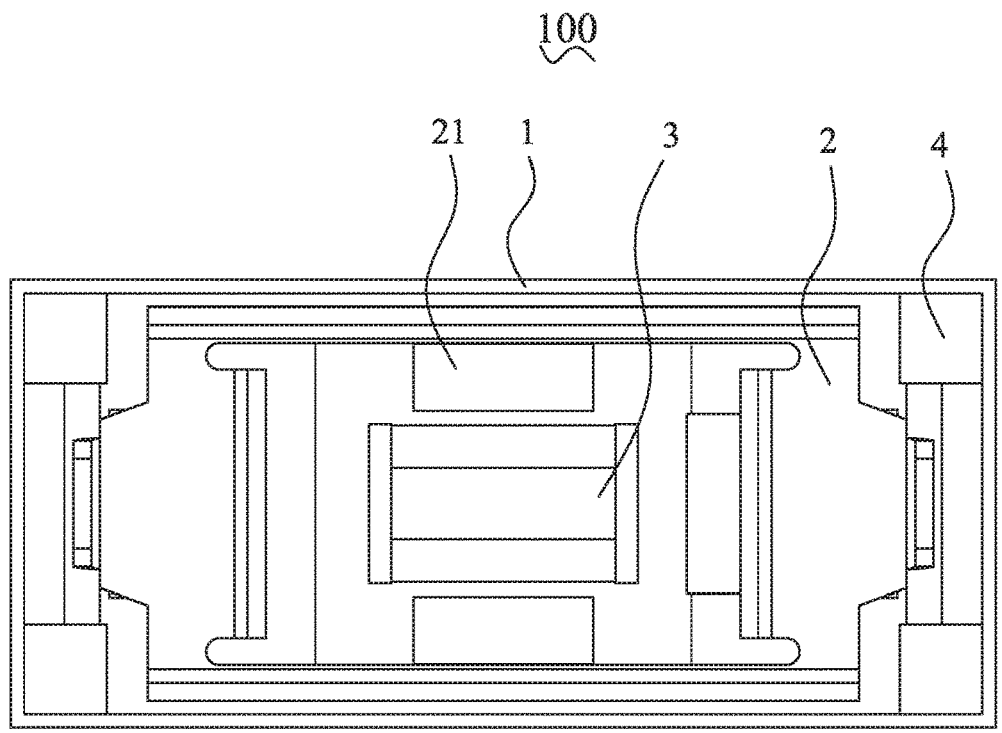
FIG. 2 is a front view of the linear vibration motor in FIG. 1.

Referring to FIGS. 1-2, the present invention provides a linear vibration motor 100, which comprises a shell 1 with a first accommodation space, a vibrator 2 and a stator 3 housed in the shell 1, and a spring 4 elastically supporting the vibrator 2. One of the vibrator 2 and the stator 3 includes a solenoid 31, and the other of the vibrator 2 and the stator 3 includes a magnetic circuit structure 21. In the specific embodiment of the invention, the stator 3 includes the solenoid 31, and the vibrator 2 includes the magnetic circuit structure 21.

The magnetic circuit structure 21 includes a first magnet 211, a second magnet 212, a third magnet 213, a fourth magnet 214 and a magnetic conductive frame 215. The first magnet 211, the second magnet 212, the third magnet 213 and the fourth magnet 214 are respectively fixed on the magnetic conductive frame 215.

The first magnet 211 and the second magnet 212 are respectively arranged at two ends of the solenoid 31. Further, the first magnet 211 and the second magnet 212 are such arranged that one end of the first magnet 211 facing the second magnet 212 has the same magnetic pole to one end of the second magnet 212 facing the first magnet 211. Here, the above-described same magnetic pole is defined as a first pole.

The third magnet 213 and the fourth magnet 214 are respectively arranged on both sides of the solenoid 31. Further, the third magnet 213 and the second magnet 214 are such arranged that one end of the third magnet 213 facing the fourth magnet 214 has the same magnetic pole to one end of the fourth magnet 214 facing the third magnet 213. Here, the described same magnetic pole is defined as a second pole. The second pole is different from the first pole. In the specific embodiment, the first pol is S-pole, and the second pole is N-pole.

Figure 3:
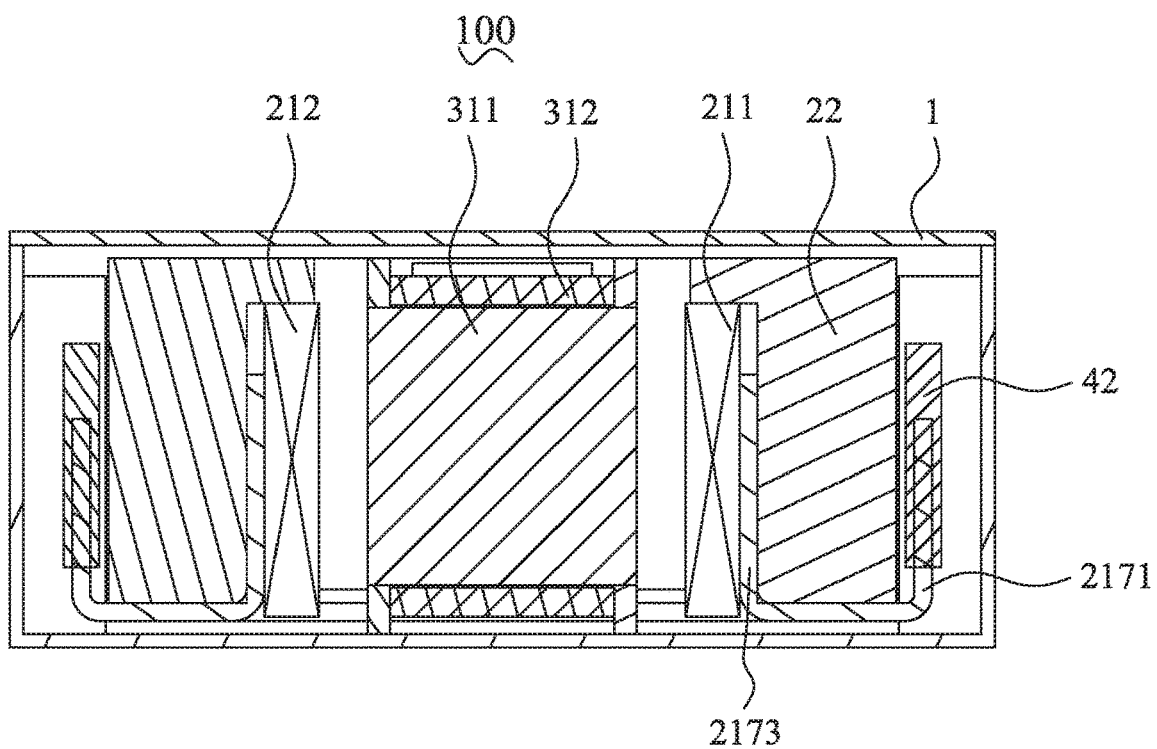
FIG. 3 is a cross-sectional view of the linear vibration motor, taken along a long axis thereof.
Figure 4:
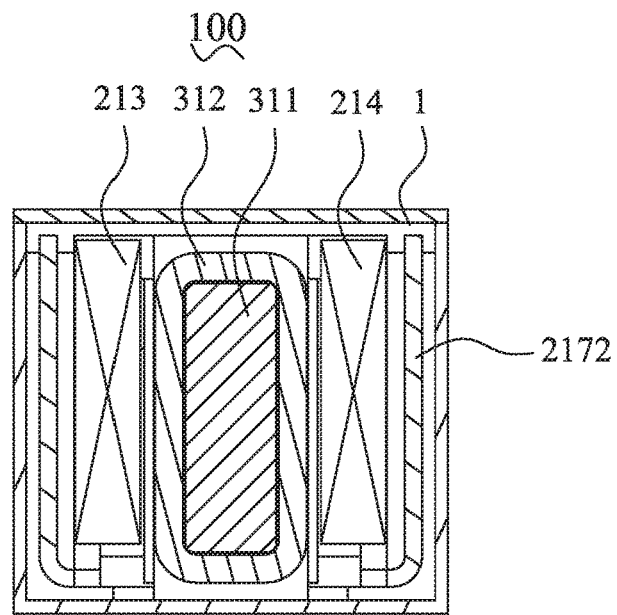
FIG. 4 is a cross-sectional view of the linear vibration motor, taken along a short axis thereof.
Figure 5:
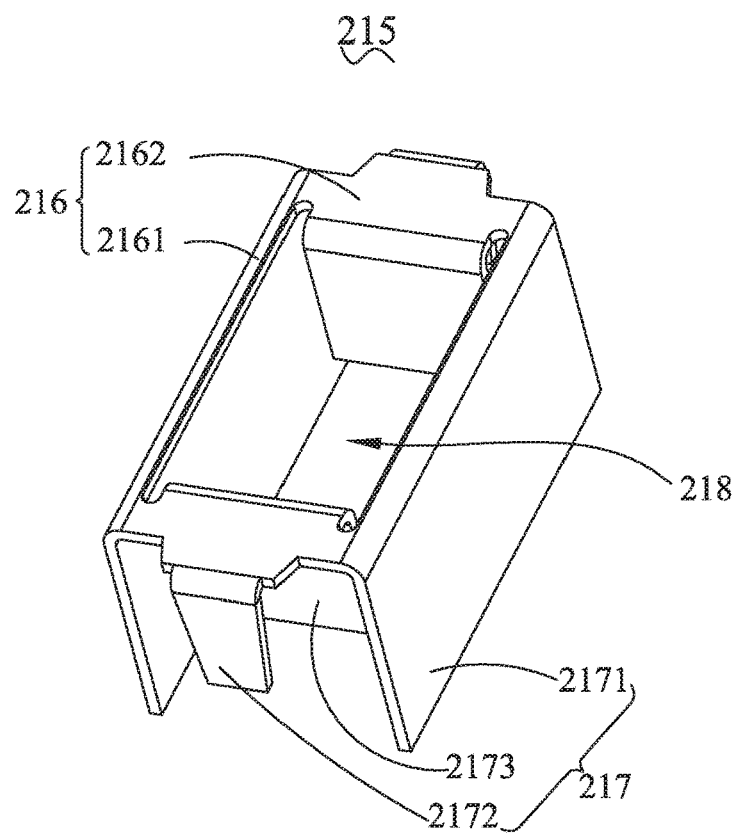
FIG. 5 is an isometric view of a magnetic conductive frame of the linear vibration motor.

Referring also to FIGS. 3-5, the magnetic conductive frame 215 has a second receiving space, a bottom wall 216 arranged parallel to a vibrator vibration direction of the vibrator 2, a side wall 217 extending from an edge of the bottom wall 216, and a through hole 218 penetrating the bottom wall 216. The bottom wall 216 is rectangular, and includes two opposite first sides 2161 and two opposite second sides connecting the first sides 2161. The side wall 217 includes two opposite first side walls 2171 extending from the first side 2161 along the vibration direction of the vibrator, and two opposite second side walls 2172 extending from the second side 2162 along a direction perpendicular to the vibration direction, respectively. The side wall 217 further includes two opposite third sidewalls 2173 extending from two opposite edges of the through hole along a direction perpendicular to the vibration direction. The third sidewall 2173 is parallel to the second sidewall 2172. The first magnet 211 and the second magnet 212 are respectively fixed on inner surfaces of the two third sidewalls 2173, and the third magnet 213 and the fourth magnet 214 are respectively fixed on inner surfaces of the two first sidewalls 2171.

The first magnet 211, the second magnet 212, the third magnet 213, the fourth magnet 214 and the solenoid 31 are all housed in the second receiving space. In addition, the first magnet 211, the second magnet 212, the third magnet 213 and the fourth magnet 214 are arranged to surround the solenoid 31. By such a configuration that the magnets (in this embodiment four magnets) surround the solenoid 31, the intensity of the magnetic field is significantly enhanced.

The solenoid 31 includes an iron core 311 and a coil 312 winding an outer surface of the iron core 311. The solenoid 31 is fixed to the housing 1 through the iron core 311, thereby forming the stator 3.

The linear vibration motor 100 further includes two springs 4 housed in the shell 1 and arranged along the vibration direction of the vibrator 2. The spring 4 is in the shape of "H", including two columns 41 fixed at two relative intervals of the shell 1 and an elastic part 42 connecting the two columns 41. The elastic part 42 is fixedly connected with the second side wall 2172.

The vibrator 2 further includes two weights 22 fixed on both ends of the magnetic conductive frame 215 along the vibration direction of the vibrator 2. The two weights 22 are respectively fixed on the outer surfaces of the two third side walls 2173. Only the third side wall 21 with magnetic conducting function is disposed between the weight 22 and the first magnet 211, and only the third side wall 21 is located between the weight 22 and the second magnet 212 73, thus the weights 22 are stably fixed by the magnetic attraction force.

The linear vibration motor of the present invention has the advantages as follows:

1. The magnetic field strength can be significantly enhanced by setting four magnets around the solenoid;

2. By setting the magnetic conductive frame, it can not only be used to conduct magnetic field and fix the magnet, but also be used to fix the weight to simplify the assembly structure and improve the reliability;

3. Fast response speed, large acceleration and wide frequency band.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A linear vibration motor, including:
    a shell with a first receiving space;
    a vibrator in the shell;
    a stator in the shell;
    one of the vibrator and the stator including a solenoid;
    the other of the vibrator and the stator including a magnetic circuit structure, the magnetic circuit structure having a first magnet and a second magnet respectively arranged at two ends of the solenoid, a third magnet and a fourth magnet respectively arranged on two sides of the solenoid;
    a magnetic conductive frame including a second receiving space, a rectangular bottom wall arranged parallel to a vibration direction of the vibrator, a side wall extending from a periphery of the bottom wall, and a through hole penetrating the bottom wall; wherein
    the bottom wall comprises two first sides arranged opposite to each other and two second sides connected to the first side and arranged opposite to each other;
    the side wall comprises a first side wall extending from the first side in a direction perpendicular to the vibration direction, a second side wall extending from the second side in the direction perpendicular to the vibration direction, a third side wall extending from two sides of the through hole in the direction perpendicular to the vibration direction for being parallel to the second side wall; and
    the first magnet and the second magnet are respectively fixed on inner surface of the two third side walls, and the third magnet and the fourth magnet are respectively fixed on inner surface of the two first side walls.

2. The linear vibration motor as described in claim 1, wherein the first magnet and the second magnet are such arranged that one end of the first magnet facing the second magnet has a same magnetic pole to one end of the second magnet facing the first magnet.

3. The linear vibration motor as described in claim 2, wherein the third magnet and the fourth magnet are such arranged that one end of the third magnet facing the fourth magnet has a same magnetic pole to one end of the fourth magnet facing the third magnet.

4. The linear vibration motor as described in claim 1, wherein the stator is fixed on the shell and includes the solenoid, and the vibrator includes the magnetic circuit structure.

5. The linear vibration motor as described in claim 4, wherein the solenoid comprises an iron core and a coil winding an outer surface of the iron core.

6. The linear vibration motor as described in claim 4 further comprising two springs housed in the shell and arranged along the vibration direction of the vibrator for being fixedly connected with the two second side walls.

7. The linear vibration motor as described in claim 6, wherein the vibrator further comprises two weights fixed on both ends of the magnetic conductive frame along the vibration direction of the vibrator.

8. The linear vibration motor as described in claim 7, wherein the two weights are respectively fixed on outer surfaces of the third side walls.

9. The linear vibration motor as described in claim 6, wherein the spring comprises two columns fixed at two opposite intervals of the shell and an elastic part connecting the two columns, and the second side wall is fixed at the elastic part.

10. The linear vibration motor as described in claim 7, wherein the spring comprises two columns fixed at two opposite intervals of the shell and an elastic part connecting the two columns, and the second side wall is fixed at the elastic part.

* * * * *